April 19, 1966   J. ROTTER   3,246,539
GEAR
Filed June 3, 1963   2 Sheets-Sheet 1
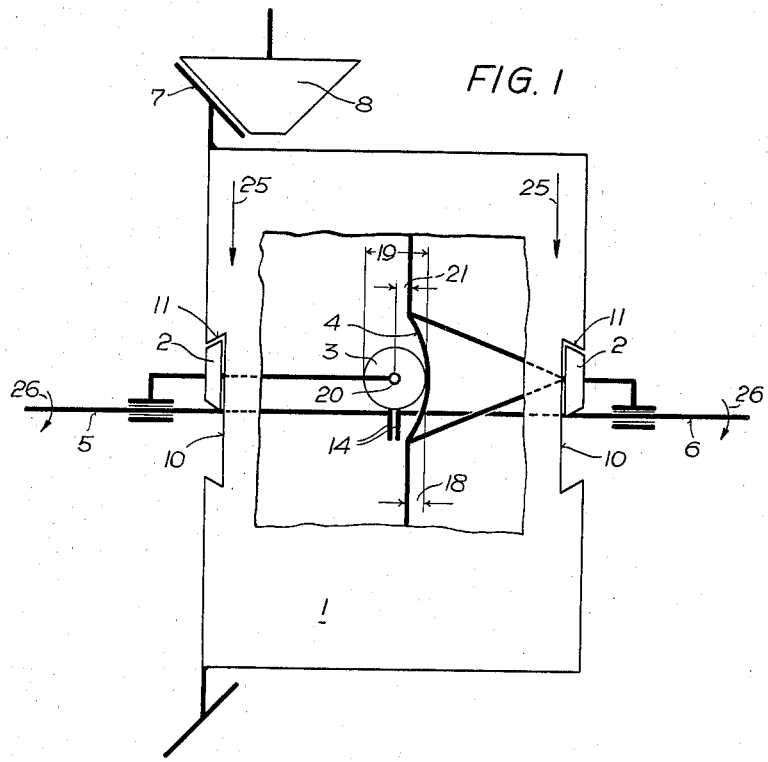
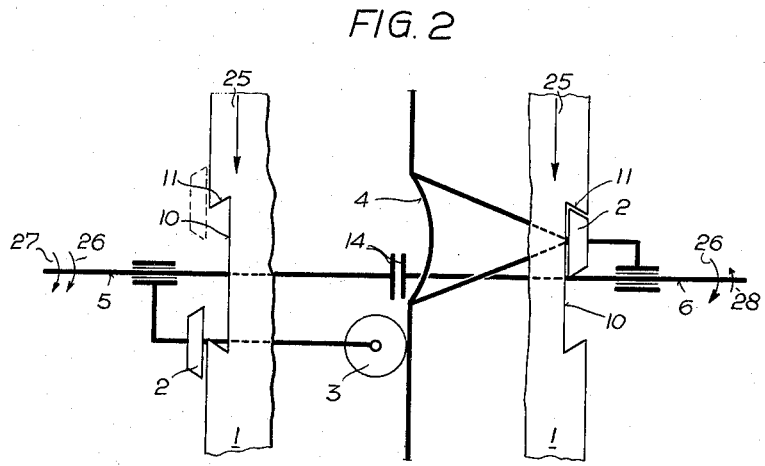
Inventor:
Josef ROTTER
By: McGlew and Toren
Attorneys April 19, 1966     J. ROTTER     3,246,539
GEAR
Filed June 3, 1963     2 Sheets-Sheet 2
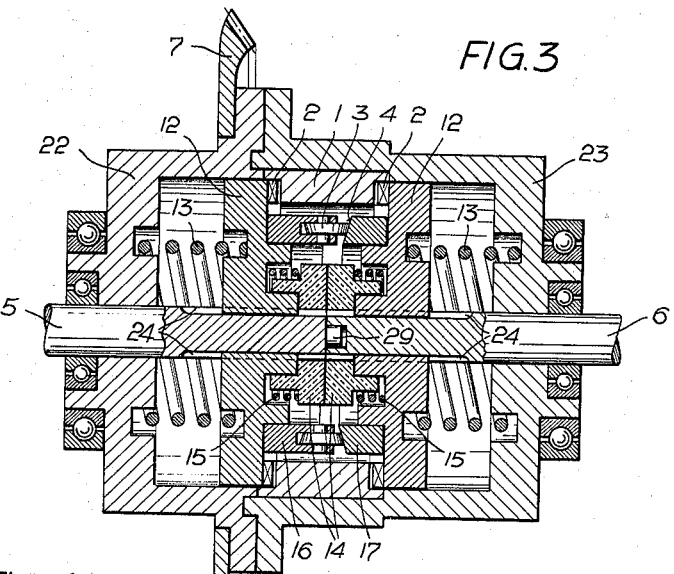
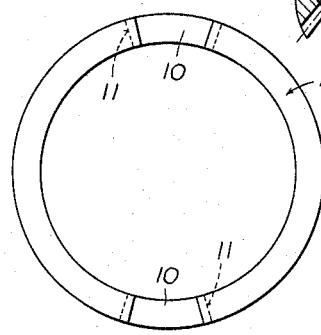
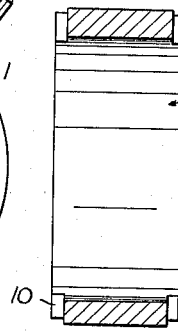
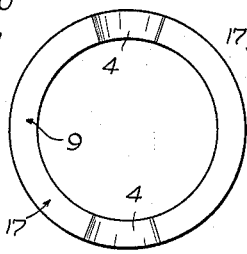
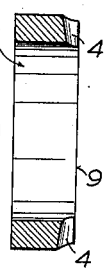
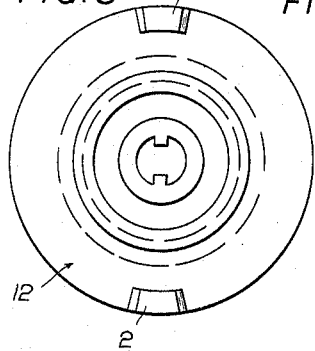
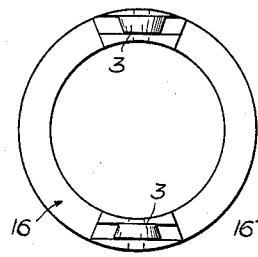
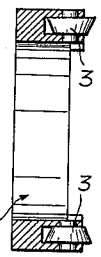
Inventor:
Josef ROTTER
By: McGlew and Toren
Attorneys 3,246,539
GEAR
Josef Rotter, 5 Franz Josefs-Kai, Vienna, Austria
Filed June 3, 1963, Ser. No. 284,965
Claims priority, application Austria, June 7, 1962,
A 4,615/62
6 Claims. (Cl. 74—650)

The invention relates to a gear particularly for motor vehicles and is characterised by gear parts which separate a shaft from the drive at different speeds of the driven shafts. According to a further object of the invention dogs are provided in the line of forces from the drive to the shafts which dogs are adjustable transversally to a displacement by way of control parts on account of a displacement with respect to a catch ring at different speeds of the shafts and which are thus disengageable from the catch ring.

One embodiment of the invention is shown by way of example in the drawings.

FIGS. 1 and 2 show diagrammatically the gear in both operating conditions. FIG. 3 shows in a section the construction of the gear. FIGS. 4 to 11 give constructive details in respective views.

The gear (differential gear) comprises two casing parts 22 and 23, forming a bell-shaped cover, being firmly connected with an axle-drive bevel wheel 7 and with the catch ring 1. The two clutch discs 12 are mounted axially slidable in grooves 24 on the ends of knockout spindles and shafts 6, 5 respectively. Thereby the ends are adjacent to each other. The discs are pressed by way of springs 13 with their dogs 2 into the grooves 10 of the catch ring 1. Between the clutch discs 12 two rings 16 and 17 are provided. One of the rings, namely 16, is provided with a roller 3 which normally lies in the recess 4 of the other ring 17, thereby both clutch discs 12 are in engagement and the drive is effected on both sides.

FIG. 1 shows diagrammatically the normal operating condition. The drive is effected in normal way by way of the pinion 8 to the axle-drive bevel wheel 7. This drives the catch ring 1 and effects a rotation of same in a direction shown by arrows 25. Then the grooves 10 take along the dogs 2 which impart a rotation by way of the clutch discs 12 to the driven shafts 5, 6, this is indicated by the arrows 26. In the normal operating condition when driving straight on both the driven shafts 5 and 6 are driven thus by the pinion 8. The whole gear is thereby a self-locked arrangement.

When driving in curves (FIG. 2) one of the shafts, e.g., the shaft 5, will rotate faster than the other shaft 6 as this is indicated by the additional arrows 27 and 28. On account of the higher speed of the shaft 5 the same is taking along the dog 2 on the left side in the indicated direction. Thus the roller 3 being firmly fixed thereto is leaving the groove 4 and, as might be seen in FIG. 2, the dog 2 is disengaged from the catch ring 1. The wheel (not shown) of the shaft 5 is now separated from the gear and might run freely and is able to compensate the longer outer way necessary when driving in curves. The wheel (not shown either) for the inner of the curve presses now by way of the shafts 6 the dogs 2 being in FIG. 2 on the right hand side tightly against the undercut 11 being hitherto overhead. Thus now as before an effective connection with the drive 7, 8 is maintained for the wheel on the inner side of the curve. Thus when driving in a curve a drive might be effected force-locked onto the wheel at the inner curve whereas the wheel at the outer curve is freely movable. During the further driving in the curve the dog 2 runs over the periphery of the catch ring 1 and comes at the end of the turn into a position being shown in FIG. 2 at the left hand side in dotted lines. If the driving in the curve is continued the dog 2 comes again in the above mentioned manner into the position shown at the left hand side of FIG. 2, below, thereby a force-locking connection between the wheel at the outer curve and the drive has not been effected. The dimensioning is taken that way that the path of motion of the dog 2 runs from the dotted position to the full lined position in a smooth manner. Thereby the undercut is likewise advantageous.

If one changes after the curve again to a straight drive a relative displacement between the dog 2 and the catch ring 1 is maintained by the hitherto free-running wheel at the outer curve as long as the dog 2 enters the groove 10 and takes again the position to be seen in FIG. 1.

At a motor braking and a drive in the curve the above explained kinematic connections are reversed. Then always the wheel at the inner curve gets free for the compensation and the wheel at the outer curve is maintained firmly connected with the drive over the gear.

Considering the above mentioned description together with the schematic FIGS. 1 and 2 the construction according to FIG. 3 is self-evident. The springs 13 act upon the clutch discs 12 with its dogs. The springs tend to keep the dogs 2 in engagement with the grooves 10 of the catch ring 1. The clutch discs 12 have brake sleeves 14 instead of the inner ends of the shafts 5, 6. Springs 15 act upon these parts 14, thus the explained change between the two operating conditions according to FIGS. 1 and 2 is always smooth. In the manner indicated at 29 in FIG. 3 the ends of the shafts might be provided with a pin and a corresponding recess for a centration. Advantageously, the spring 15 is half as strong as the spring 13.

The FIGS. 4 and 5 show the catch ring 1 and the FIGS. 6 and 7 the clutch discs 12 both in elevation and sectional side views. In the same manner the FIGS. 8 and 9 show the counter ring 17 provided with the contact surface 9 and FIGS. 10 and 11 show the ring 16 provided with the roller 3. According to the invention it is advantageous if the depth 18 of the recess 4 amounts to a third of the diameter 19 of the roller 3 whereby in the normal operating condition the axis of rotations 20 of the roller 3 is spaced from the contact surface 9 by an amount being about a sixth of the diameter 19 of the roller.

The gear according to the invention gives excellent driving conditions of the motor vehicle during the ride in a curve, with respect to the engine power as well as with respect to motor braking. By the invention the danger of skidding is practically removed; defects of the tire and burstings at the drive wheels are not dangerous any more. Having a one-side shaft failure (knockout spindle failure) it is, nevertheless, possible to move the vehicle with the second operable wheel, only. Moreover, the gear needs practically no oil lubrication.

The invention might not only be used as differential gear with motor vehicles but could be used in cases too, where different gear parts have to be driven by a central drive and where such an adjustment is desired for instance with machine tools. This gear might be used where up to now the usual differential gears have been used. The form of the dogs and the corresponding grooves could easily be adapted to the present operating conditions. The undercutting shown in the embodiment might be omitted, too. Instead of a roller a slider might be used with sturdy gears.

I claim:
1. A differential gear mechanism comprising, in combination, driving means; a pair of driven elements; a clutch driving member rotated by said driving means; a pair of clutch driven members coaxial with said clutch driving member on axially opposite sides thereof and each in driving relation with a respective driven element; means biasing said clutch driven members to engage opposite sides of said clutch driving member normally to drive said driven elements in synchronism; the facing surfaces of said clutch driving and driven members having circumferentially extending interengageable teeth and notches to provide a positive drive of said driven members from said driving member; said teeth being on one of said clutch driving and driven members and said notches being on the other thereof; said clutch driven members being displaceable axially to disengage said teeth from said notches; said notches being undercut at their ends for substantially conforming engagement with the ends of said teeth and having arcuate extents substantially greater than those of said teeth, whereby a predetermined relative angular displacement of the clutch driving member and a clutch driven member is required to provide for relative axial displacement of the clutch driven member; and cam means interacting between said clutch driven members and operable, responsive to such predetermined relative angular displacement of one clutch driven member, to displace the latter axially to disengage it from the clutch driving member.

2. A differential gear mechanism, as claimed in claim 1, in which said cam means comprises a roller fixed axially relative to one clutch driven member and engaging a cam surface fixed axially relative to the other clutch driven member; said cam surface including an arcuate recess portion facing said one clutch driven member and angularly related, relative to said cooperating teeth and notches, in such manner that, when a tooth is fully engaged in a cooperating notch, said roller is at the deepest part of said arcuate recess and, as the tooth and notch are relatively angularly displaced, said roller will move outwardly along the surface of said arcuate recess to axially displace one clutch driven member relative to said clutch driving member.

3. A differential gear mechanism, as claimed in claim 2, including a first ring rotatable with one clutch driven member and carrying said roller, and a second ring rotatable with the other clutch member and formed with said cam surface.

4. A differential gear mechanism, as claimed in claim 1, including a pair of brake disks each fixed relative to one of said clutch driven members; and means biasing said brake disks into engagement normally to maintain said clutch driven members in frictional driving relation with each other.

5. A differential gear mechanism, as claimed in claim 4, in which said driven elements are a pair of coaxial stub shafts; said stub shafts being splined; said brake disks being splined for driving interconnection with said stub shafts while being relatively axially displaceable therealong.

6. A differential gear mechanism, as claimed in claim 1, in which said driven elements are a pair of coaxial stub shafts, said stub shafts being splined and said clutch driven members being splined for driving engagements with said stub shafts while being axially displaceable therealong.

References Cited by the Examiner
UNITED STATES PATENTS

| | | | |
|---|---|---|---|
| 2,667,087 | 1/1954 | Myers | 74—650 |
| 2,667,088 | 1/1954 | Myers | 74—650 |
| 2,830,466 | 4/1958 | Myers | 74—650 |

DON A. WAITE, *Primary Examiner.*